United States Patent [19]

Reinbold et al.

[11] 4,085,228

[45] Apr. 18, 1978

[54] PREPARATION OF PIZZA CHEESE

[75] Inventors: George W. Reinbold, Wheat Ridge; Malireddy S. Reddy, Thornton, both of Colo.

[73] Assignee: Leprino Cheese Co., Denver, Colo.

[21] Appl. No.: 715,577

[22] Filed: Aug. 18, 1976

[51] Int. Cl.$^2$ .............................................. A23C 19/02
[52] U.S. Cl. ...................................... 426/36; 426/38; 426/43
[58] Field of Search ..................... 426/36, 38, 40, 43

[56] References Cited

U.S. PATENT DOCUMENTS

| | | | |
|---|---|---|---|
| 2,796,351 | 6/1957 | Walter et al. | 426/36 |
| 3,531,297 | 9/1970 | Kielsmeier et al. | 426/36 |
| 3,843,801 | 10/1974 | Efthymiou | 426/36 |
| 3,961,077 | 6/1976 | Kielsmeier | 426/36 |

OTHER PUBLICATIONS

Dahlberg, et al., The Development of Flavor in American Cheddar Cheese, made from Pasteurized Milk, with Streptococcus Fafcalis Starter, J. Da. Sci., vol. 31, 1948, (pp. 275–284).
Kosikowsky, et al., The Growth and Survival of Streptococcus Faeczlis in Pasteurized Milk American Cheddar Cheese, J. Da. Sci., vol. 31, 1948, (pp. 285–292).
Davis, J. G., Cheese, vol. I, American Elsevier Publishing Co., Inc., N.Y., 1965, (pp. 177–180).
Kosikowski, F., Cheese and Fermented Milk Foods, published by the Author, Cornell University, N.Y., 1966, (pp. 155–158).
Kosikowsky, F. V., The Manufacture of Mozzarrelle Cheese from Pasteurized Milk, J. Da. Sci., vol. 34, 1951, pp. 641–648.

*Primary Examiner*—David M. Naff
*Attorney, Agent, or Firm*—Tilton, Fallon, Lungmus & Chestnut

[57] ABSTRACT

Low-moisture mozzarrella (pizza cheese) is prepared using a standard starter culture plus an additional culture selected from *Pediococcus cerevisiae, Lactobacillus plantarum, Streptococcus faecalis, Streptococcus durans,* and *Lactobacillus casei,* or mixtures thereof. Although the cheese is made by the usual processing steps, the cheese product has a reduced lactose sugar (and/or its monosaccharide derivatives) content due to the added culture, which metabolizes residual lactose during a cold temperature holding at the end of the process. The resulting cheese has improved properties for the manufacture of pizza, being substantially nonburning and having improving melt, flavor, and color characteristics.

16 Claims, No Drawings

PREPARATION OF PIZZA CHEESE

BACKGROUND

Under the present standard of the U.S. Department of Health, Education, and Welfare, Food and Drug Administration, the terms "Mozzarella" and "Scamorza" are used interchangeably. There are two types of Mozzarella (Scamorza) cheese, namely "regular" and "low-moisture" cheese. The regular Mozzarella has a moisture content of more than 52% up to 60%, while the low-moisture Mozzarella has a moisture content above 45% but not over 52%. These two kinds of Mozzarella are also referred to as "high-moisture" and "low-moisture" Mozzarella. Mozzarella cheese prepared from whole milk must contain not less than 45% fat on a solids basis, and part-skim Mozzarella must contain not less than 30% fat up to 45%. The term "pizza cheese" as used herein refers to low-moisture Mozzarella, which may be made from either whole milk or part-skim milk. Commercially, most "pizza cheese" manufactured in the United States is part-skim low-moisture Mozzarella.

In terms of volume, the major use of pizza cheese is in the commercial manufacture of pizza. For this purpose, it is important that the cheese slice or shred readily, that the slices or shreds can be handled and applied to the pizza, and that during the high temperature baking of the pizza, the cheese slices or comminuted forms continue to lay flat, and melt without burning or blistering. These properties are also desirable when pizza cheese is used for preparing other baked Italian dishes.

Another important property of pizza cheese is referred to as "stringiness". This is the "stringy" texture which can be observed when the cheese is pulled apart. It is most noticeable when the cheese has been heated and melted, as in the preparation of pizza. Without this stringy texture, a pizza cheese is usually regarded as lacking a typical and essential characteristic.

To obtain the proper stringy character in pizza cheese, a mixed starter culture is utilized containing both "coccus" and "rod" bacteria. The coccus organism is usually *S. thermophilus*. The rod organism is a heat-resistant lactobacillus, which commonly is *L. bulgaricus*. *L. helveticus* can also be used, or mixtures of *L. bulgaricus* and *L. helveticus* with the *S. thermophilus*. Typically, the rod and coccus organisms are cultured together to form a bulk starter, which is added to the pasteurized cow's milk in the cheese vat at a level of around 1.5 to 2.5% by weight based on the milk.

Another step in the manufacture of pizza cheese is important in producing a cheese with the typical Mozzarella stringiness. This is the mixing and stretching of the cheese curd in water at an elevated temperature. In batch processing of Mozzarella, water temperatures as high as 180° F. have been used for the mixing and stretching of the curd. For low-moisture Mozzarella, lower temperatures can be used with continuous mix apparatus, such as the mixer disclosed in U.S. Pat. No. 3,713,220. Typical mixer temperatures with such apparatus are 135° to 155° F.

THE PROBLEM

In the manufacture of pizza cheese, during normal processing operations, the lactose in the cheese is not exhausted by bacterial action, although a large part of the lactose is converted to lactic acid by the bacteria of the starter culture. One of the features of the process for manufacturing pizza cheese described in U.S. Pat. No. 3,531,297 was that the step of soaking the curd in warm water extracted lactose from the curd, and thereby reduced the final lactose content of the cheese. In general, the lower the lactose content of the final pizza cheese, the less tendency there is for the cheese to blister, burn, or char when it is subjected to high temperature baking.

While the process of U.S. Pat. No. 3,531,297 was used extensively on a commercial basis in the United States, and was a desirable commercial process, it does have certain disadvantages. The large curd soaking tanks add to the equipment and plant space costs, and the used soak water, which contains lactose, lactic acid and other substances, can add considerably to the waste disposal burden of an operating plant. Another limitation of the process of U.S. Pat. No. 3,531,297 is that the entire processing operation from the cheese vat to the mixer must be carefully timed, sequenced, and carried out on a substantially continuous basis. In practice, this means that the operators of the plant must almost immediately carry out the mixing of the cheese on the completion of the curd soak.

The patent just referred to (U.S. Pat. No. 3,531,297) is owned by Leprino Cheese Co., of Denver, Colorado, which is also the assignee of the present application. In recent years, this company has developed an improved process for manufacturing pizza cheese, which has to a considerable extent replaced the soak tank process of U.S. Pat. No. 3,521,297. This newer process is described in Leprino's U.S. Pat. No. 3,961,077, which is referred to as the "stored curd" process. In connection with the commercial use of this newer process, it has been found desirable to provide means for further reducing the lactose content of the final cheese product. In the stored curd process, after cooking, the curd is separated from the whey and is held in a cold storage room until the internal pH of the curd reaches the proper pH for mixing and stretching.

In the experimental studies leading to the present invention, it was found that Pizza cheese should have a lactose content of less than 0.5% by weight, such as 0.2% or lower. Such low lactose levels were not consistently achieved even by the earlier soak tank process. Consequently, there has long been a need to provide a process improvement which places the final lactose content in the control of the manufacturer.

SUMMARY OF THE INVENTION

The method of this invention provides for the first time a means for consistently and uniformly producing pizza cheese with a lactose content low enough to substantially prevent burning or blistering of the cheese during the baking of pizzas. As indicated above, the lactose content of the final cheese product should be below 0.5% by weight, and preferably below 0.3%, such as 0.0 to 0.25%. Although the bacteria of the typical Mozzarella starter culture utilize lactose and thereby reduce lactose content during the manufacture of the cheese, there is no assurance that final lactose levels as low as 0.2 to 0.3%, or lower, will be achieved. It therefore remained for the present invention to solve this problem.

To achieve a controlled low final lactose content in the cheese, the milk in the cheese vat is inoculated with an additional culture. This culture provides bacteria which are capable of continuing to utilize lactose after the pizza cheese has been made, and is being held in cold temperature storage. To accomplish this result, the bacteria not only must be capable of utilizing lactose, but they must be sufficiently thermoduric to survive the high temperature mixing, stretching, and molding of the cheese. Further, the bacteria must be relatively salt tolerant, and must be capable of growing, at least slowly under cold temperature storage conditions (e.g. 40°–45° F.). Moreover, the bacteria must be compatible with the entire cheese making process: for example, being non-proteolytic, nonlipolytic, nonpathogenic, nonchromogenic, and noninhibitory to the starter culture bacteria.

During the experimental work leading to the present invention, a number of species of bacteria were discovered to meet the foregoing criteria, and thereby to be capable of achieving the objective of this invention. These organisms include: *Pedicoccus cerevisiae, Lactobacillus plantarum, Streptococcus faecalis, Streptococcus durans,* and *Lactobacillus casei.* A description of an improved process for manufacturing pizza cheese using one or more of these organisms will now be set out.

DETAILED DESCRIPTION

In the manufacture of pizza cheese using the process improvement of the present invention, most of the steps of the process are carried out in the same way as in prior art processes. In general, the procedural steps are the same as those known for manufacture of a low-moisture Mozzarella, herein referred to as "pizza cheese". The final cheese product will exhibit the typical "stringiness", as manifested particularly on the melting of the cheese.

Conventional processes for preparing a pizza cheese is described in Reinbold, *Italian Cheese Varieties,* Vol. I, Pfizer Cheese Monographs (1963). The improved process of the present invention can also be practiced in connection with the "soaked curd" process described in U.S. Pat. No. 3,531,297, or with the "stored curd" process described in U.S. Pat. No. 3,961,077. In general, the improvements of the present invention can be utilized to provide a means for controlling and reducing the final lactose content of pizza cheese.

The starting material for the improved process, as in the prior art, is either whole milk or a mixture of whole milk and skim milk, or standardized milk, fat withdrawn. In general, the fat content on a solids basis can range from 30 to 45% or higher (depending on the applicable standard). For preparing part-skim low-moisture Mozzarella, which is the preferred pizza cheese in the United States, the cheese should contain at least 30% fat up to 45%. Moreover, the moisture content of the cheese product should be above 45% but not above 52%. It should be understood, however, that these moisture and fat contents are not critical limits, but rather are governmental standards, and may not apply in the same way in countries other than the United States.

As in the prior art, a standard starter culture is added to the milk in the cheese vat. This may be a culture concentrate, as supplied by the culture manufacturer, or it may be a bulk starter culture prepared by the cheese manufacturer. The usual inoculation level is within the range from 1 to 3% by weight based on the milk, typically about 1.5 to 2%. For making pizza cheese, it has been found important to include *S. thermophilus* as one of the bacteria. In addition to this coccus organism, one or more "rod" bacteria should be present. Most commonly, the rod organism is *L. bulgaricus.* However, *L. helveticus* can be used, or other high-temperature-growing bacteria. In accordance with present practice, the starter culture is prepared as a mixed coccus-rod culture with the coccus organisms predominating. Desirably, the coccus to rod ratio is about 3–4:1.

In accordance with the present invention, the batch of milk in the vat is also inoculated before making the cheese curd with from 0.5 to 3.0% by weight based on the milk of an additional viable culture providing one or more of the following bacteria:
  *Pediococcus cerevisiae*
  *Lactobacillus plantarum*
  *Streptococcus faecalis*
  *Streptococcus durans*
  *Lactobacillus casei*

More than one of the above species can be used, such as a mixture of *Pediococcus cerevisiae* and *Lactobacillus plantarum.* However, all of the foregoing are effective as single species. Suitable cultures of these bacteria are available commercially, or can be readily obtained. Cultures of *Pediococcus cerevisiae* are marketed under the names "Hansen's PC-1" and "Saga", respectively, by Chr. Hansen's Laboratory, Inc., Milwaukee, Wisconsin, and Microlife Technics, Sarasota, Florida. Suitable cultures of *Lactobacillus plantarum* are available from Chr. Hansen's Laboratory, Inc., being sold as "Hansen's LP-1" and "Hansen's LP-2". A mixed culture of *Pediococcus cerevisiae* and Lactobacillus plantarum can be obtained from Merck & Co., Inc., Chemical Division, Rahway, New Jersey, being described as concentrated Lactacel MC Lactic Acid Starter Culture. (This culture is licensed for use in sausage fermentation by the American Meat Institute Foundation under U.S. Pat. No. 2,907,661.) Suitable cultures of *S. durans, S. faecalis,* and others of the above species, can be obtained from public depositories, such as The Northern Regional Research Laboratories, Peoria, Illinois (identified by NRRL Nos.) or The American Type Culture Collection, Rockville, Maryland (identified by ATCC Nos.). For example, the *S. faecalis* culture available under ATCC No. 8043 can be used. Suitable *S. durans* strains can be isolated from natural sources, such as from young Cheddar cheese. See W. S. Clark, Jr., "The Low Temperature Microflora of Young Cheddar Cheese.",Ph.D. Thesis, Iowa State University, Ames, Iowa (1963). Suitable cultures of *L. casei* are available from public depositories. One suitable strain of *L. casei* is ATCC No. 7469.

The selected strain of the additional culture may be grown in a suitable medium to prepare a bulk inoculant for introduction to the cheese vat. The media is not critical, but conventional media for culturing such organisms can be used, including non-fat dry milk media, whey-based media, etc. After the fermentation to produce the bulk inoculant has been completed, it is introduced into the cheese vats at the level specified above, that is, from 0.5 to 3.0% by weight based on the milk, or preferably in an amount of about 1.5 to 2.5% by weight.

After the inoculation of the milk with both the standard starter culture and the additional culture, the curd making process is carried out in the usual way, including the steps of ripening, setting, and cutting. The combined result of such vat processing steps is to convert the milk to a mixture of curd and whey ready for cooking. Such vat procedures are described in the literature. See, for example, Reinbold, *Italian Cheese Varieties,* p. 18–19, Pfizer Monograph, Vol. I, 1963.

After cutting the curd, the making of the cheese is continued by cooking the curd-whey mixture in the vat at a temperature of about 100° to 125° F. Temperatures in the range of about 105° to 120° F. are usually favorable for mixed *S. thermophilus* — *L. bulgaricus* growth.

At the conclusion of the cooking, the curd and whey are separated. The granular curd can be subjected to Cheddaring, or it can be processed in other ways, such as by the soak tank process of U.S. Pat. No. 3,531,297, or by the stored curd process of U.S. Pat. No. 3,961,077. After further treatment of the curd, by whatever particular processing steps are employed, the curd is always subjected to mixing and stretching in heated water to impart a stringy texture to the cheese. Batch mixing may be used with water temperatures up to 170° to 190° F. (e.g. 180° F.), or a continuous mixer may be used with lower water temperatures, such as the mixer described in U.S. Pat. No. 3,713,220. Even with such continuous mixing apparatus, a water temperature above 130° F. is needed, such as a water temperature in the range of 135° to 150° F.

The mixed, stretched curd may be formed into curd bodies or blocks in various ways. A continuous molding apparatus may be used. Usually, the cheese remains at an elevated temperature, such as the temperature employed for the mixing and stretching, or higher, during the molding operation.

The molded curd blocks or bodies are then salted, usually by placing them in brine soaking tanks for several hours. The salted cheese is then wrapped, and placed in a cold storage holding room. Usually, the holding temperature should be kept below 55° F. The cheese is usually not frozen, except where it is sliced or diced immediately prior to freezing. In practicing the present invention, it is not necessary to modify the holding conditions, except as to the time of holding.

For the purposes of the present invention, the salted cheese bodies are held at a non-freezing temperature below 55° F. for at least 5 days to reduce the residual lactose content of the cheese. Typically, the cheese may be held for 10 to 15 days at a temperature of 40° to 45° F. Under these conditions, the added bacteria, which have survived the mixing, stretching, and molding, will continue to grow slowly and metabolize lactose.

The term "lactose sugar content" as used herein refers to the amount of lactose present together with the monosaccharide derivatives thereof. Analytical measurements therefore should be made to determine the total of lactose, glucose, and galactose.

The lactose sugar content of the cheese can be determined at the beginning of the cold temperature storage, and further tests can be made at 1-day or 2-day intervals to determine the progress of the lactose sugar reduction. In general, it can be expected that the lactose sugar content of the cheese at the beginning of the holding will be above 0.25% by weight, but usually not over 0.75% lactose sugar. At the conclusion of the holding, the lactose content should be below 0.3%. A lactose sugar content in the range of 0.0 to 0.25% is optimum. Usually, such lactose sugar reduction can be obtained with 5 to 15 days of holding. If needed, the holding can be extended to as long as 30 days. Fortunately, to protect the pizza cheese from burning and blistering when used for baking pizza, it is not necessary to totally exhaust the lactose sugar. In general, the process of this invention involves a continuing of the holding until a substantially nonburning pizza cheese is obtained.

The process improvement of the present invention is further illustrated by the following experimental examples:

EXAMPLES

In the following experiments, all bacteria species were grown for 15 hours at 100° F. in a medium adjusted to pH 5.4, consisting of 85 parts of whey protein concentrate, 12 parts of spray-dried acid whey powder, 2 parts of 36% milk fat whey cream, and 1 part of hydrolyzed vegetable protein, all at a concentration of 20% solids in water as a suspensory medium. After inoculation and incubation, 2% of this bulk bacterial culture was added to the vat milk simultaneously with 2% of a mixed *Lactobacillus bulgaricus* and *Streptococcus thermophilus* starter culture. From this point on, a conventional make procedure for pizza cheese was followed. Both low-moisture part-skim, and whole milk Mozzarella were made. Chemical composition of all cheeses were determined at 2 days of age.

Sample loaves of all cheeses were examined at 1, 2, and 3 weeks of age using these tests:

A. Moisture — 10 gram aliquots of comminuted cheese were dried at 100° C. for 17 hours in an atmospheric hot-air oven. Moisture loss was determined and expressed as percent cheese moisture.

B. pH — Eight parts of ground cheese were wetted with 2 parts of distilled water and were lightly compacted in a small glass beaker. pH measurements were made with a combination glass electrode and a Corning Model 10 expanded scale pH meter.

C. Bacterial counts — Standard Plate Counts were made as described in *Standard Methods for the Examination of Dairy Products*, 13th ed., 1972.

D. Cheese quality — Twenty-pound loaves of cheese were cut in half and were subjected to organoleptic examination by a panel of at least three trained observers. Cheeses were tried for body, texture, and color characteristics.

E. Melting quality — Weighed quantities of shredded cheeses were spread uniformly on tomato-sauce covered pizza shells and were baked for 5 minutes at 650° F. in a small, conventional pizza oven. The finished pizzas were observed for signs of burned, blistered, or excessively oiled-off cheese. The melted cheese also was observed for tendency to spread or cover, stretch, firmness, color, and "bite-off" characteristics.

F. Lactose color code — As a supplement to actual physical testing on pizzas, all cheeses were further tested by heating 10 grams of comminuted cheese evenly spread over the bottoms of a 2¼ inch aluminum foil dish for 17 hours at 100° C. in an atmospheric hot-air oven. The resultant dried cheese discs were compared against a prepared color chart. Charring of residual sugars gives presumptive evidence of the level of content. Color changes induced in this manner, if not influenced by excessive salt content, usually correlate with the actual performance of the cheese in use.

The standard color chart used for colormetric determination of lactose sugar content provided a scale from 0% lactose sugar to 0.75%. The corresponding color code numbers and lactose sugar contents were as follows:

| Color Code Number | Lactose Sugar Content |
|---|---|
| 1 | 0.0% |
| 2 | 0.2% |
| 3 | 0.5% |
| 4 | 0.75% |

In the following tables presented with each example, figures and comments in parentheses refer to the negative control cheeses (no supplementary bacterial cultures added) made in adjoining cheese vats under identical conditions. Some apparent anomalies in results should be attributed to occasional unexplainable differences between loaves in a vat and between vats of cheese. Overall and average results must be stressed in evaluation.

Experiment 1

Test organism — *Pediococcus cerevisiae* (Hansen's PC-1). The pH differences were slight but the added organism kept the pH slightly lower showing sugar utilization. Bacterial counts were slightly higher in the cheese containing the added *Pediococcus cerevisiae*. There were few differences in overall cheese quality but melting quality was much improved. Lactose and other sugars disappeared faster as shown by the color code. The data is summarized in Table A.

TABLE A

*Pediococcus cerevisiae*

| AGE IN WEEKS | pH | STANDARD PLATE COUNT/G | CHEESE QUALITY | MELTING QUALITY | LACTOSE COLOR CODE |
|---|---|---|---|---|---|
| 1 | 5.26 | $2.3 \times 10^7$ | Lacks flavor, good body. | Good melt and stretch. Color white. | 4 |
| 1 | (5.25) | ($1.0 \times 10^8$) | (Lacks flavor, excellent body). | (Fair melt, slight burn and blister, good stretch) | (4) |
| 2 | 5.35 | $1.1 \times 10^6$ | Lacks flavor, body weakened. | Excellent melt, color, and cook. Fair stretch. | 3 |
| 2 | (5.36) | ($1.0 \times 10^5$) | (Lacks flavor, good body) | (Good melt, fair stretch, slight burn & blister. White) | (3) |
| 3 | 5.34 | $1.1 \times 10^6$ | Good flavor, body good. | As above | 2+ |
| 3 | (5.46) | ($1.0 \times 10^5$) | (Same) | (Fair melt, white, same) | (3) |

Moisture: *Pediococcus cerevisiae* - 48.8%; Negative control - 48.3%.
Salt: *Pediococcus cerevisiae* - 0.90%; Negative control - 0.92%

Experiment 2

Test organism — *Lactobacillus plantarum* (Hansen's LP-2). pH in the negative control cheese differed markedly over the 3-week aging showing less fermentative action. At this point, the Standard Plate Count (SPC) in the control cheese had begun decreasing. Cheese and melting quality were greatly improved by the added *Lactobacillus plantarum*. The color code showed sugar loss in both cheese undoubtedly related to the high SPC's in both cheeses. The data is summarized below in Table B.

TABLE B

*Lactobacillus plantarum*

| AGE IN WEEKS | pH | STANDARD PLATE COUNT/G | CHEESE QUALITY | MELTING QUALITY | LACTOSE COLOR CODE |
|---|---|---|---|---|---|
| 1 | 5.04 | $6.1 \times 10^8$ | Good flavor and body. | Good melt and stretch. White. | 1 |
| 1 | (5.07) | ($7.4 \times 10^8$) | (Lacks flavor, good body). | (Excellent melt, fair stretch, white). | (1) |
| 2 | 5.09 | $5.7 \times 10^8$ | Excellent flavor and body. | Sl. oily. Excellent melt, white, short stretch. | 1 |
| 2 | (5.06) | ($4.6 \times 10^8$) | (Fair flavor, good body). | (Good melt, sl. oil, short stretch some burn & blister). | (1) |
| 3 | 5.09 | $4.8 \times 10^8$ | Excellent flavor and body. | Excellent in all categories. | 1 |
| 3 | (5.34) | ($2.5 \times 10^7$) | (Fair flavor, sl. soft body). | (Fair melt, sl. oil, slight burn and blister). | (3) |

Moisture: *Lactobacillus plantarum* - 46.6%; Negative control - 47.8%.
Salt: *Lactobacillus plantarum* - 0.83%; Negative control - 0.83%.

Experiment 3

*Streptococcus faecalis* (ATCC No. 8043). Overall, this test organism produced an excellent cheese much improved over its paired negative control. The lactose color code results were impaired by the high salt levels but still showed the greater sugar fermentation by the added *Streptococcus faecalis*. The data is summarized below in Table C.

TABLE C

*Streptococcus faecalis*

| AGE IN WEEKS | pH | STANDARD PLATE COUNT/G | CHEESE QUALITY | MELTING QUALITY | LACTOSE COLOR CODE |
|---|---|---|---|---|---|
| 1 | 5.02 | $3.7 \times 10^8$ | Sl. soft body, sl. flavor. | Sl. burn & blister, white cook, short stretch. | 4 |

TABLE C-continued

| | | | Streptococcus faecalis | | |
|---|---|---|---|---|---|
| AGE IN WEEKS | pH | STANDARD PLATE COUNT/G | CHEESE QUALITY | MELTING QUALITY | LACTOSE COLOR CODE |
| 2 | (5.20) | (1.1 × 10⁸) | (Lacks flavor, sl. soft body) | (Fair melt, sl. burn & blister, short stretch). | (4) |
| | 5.04 | 2.0 × 10⁸ | Excellent flavor, good body. | Excellent melt, white cook, short stretch. | 4— |
| | (5.28) | (2.2 × 10⁶) | (Flavor good, good body). | (Slight burn and blister, fair melt, no stretch). | (4) |
| 3 | 5.22 | 3.7 × 10⁸ | Good flavor, body now sl. soft. | Excellent melt, white cook, short stretch. | 3 |
| | (5.05) | (2.7 × 10⁷) | (Sl. flavor, weak body). | (Sl. burn and blister, fair melt, white cook). | (3+) |

Moisture: *Streptococcus faecalis* - 51.8%; Negative control - 51.9%
Salt: *Streptococcus faecalis* - 2.18%; Negative control - 2.3%

Experiment 4

A mixture of two strains of *Streptococcus durans* was used as the added culture. Again, pH and SPC differences are favorably apparent. Cheese quality and melting quality were more rapidly enhanced by the *Streptococcus durans*. The lactose color code in this trial did not indicate the actual difference in cheese utlity but did favor the cheese with the added culture. The data is summarized below in Table D.

Experiment 5

*Lactobacillus casei* (ATCC No. 7469). Very favorable differences in pH and SPC's were obtained. Note the increasing pH and decreasing bacterial population in the negative control cheese. Cheese and melting quality characteristics greatly favored the inclusion of the added *Lactobacillus casei* in cheesemaking and aging. Very favorable and indicative lactose color code results were obtained showing the assimilation of lactose sug-

TABLE D

| | | | Streptococcus durans | | |
|---|---|---|---|---|---|
| AGE IN WEEKS | pH | STANDARD PLATE COUNT/G | CHEESE QUALITY | MELTING QUALITY | LACTOSE COLOR CODE |
| 1 | 5.11 | 5.7 × 10⁸ | Sl. flavor, good body. | Fair melt, good stretch, white cook Sl. burn & blister. | 3 |
| | (5.31) | (2.0 × 10⁷) | (Lacks flavor, firm, rubbery body) | (Poor melt, fair stretch, slight burn and blister). | (4) |
| 2 | 5.25 | 2.6 × 10⁶ | Good flavor, excellent body. | Excellent melt, fair stretch. White cook. | 3 |
| | (5.32) | (6.0 × 10⁵) | (Lacks flavor, excellent body) | (Fair melt, moderate burn & blister, cook not white) | (3+) |
| 3 | 5.21 | 1.2 × 10⁸ | Good flavor, body now sl. soft. | Good melt, white cook, sl. burn & blister. | 3 |
| | (5.32) | (1.9 × 10⁷) | (Sl. flavor, good body). | (Good melt, slight burn & blister, not white, fair stretch) | (3+) |

Moisture: *Streptococcus durans* - 49.6%; Negative control - 48.3%.
Salt: *Streptococcus durans* - 1.05%; Negative control - 1.02%.

ars by the *Lactobacillus casei*. The data is summarized below in Table E.

TABLE E

| | | | Lactobacillus casei | | |
|---|---|---|---|---|---|
| AGE IN WEEKS | pH | STANDARD PLATE COUNT/G | CHEESE QUALITY | MELTING QUALITY | LACTOSE COLOR CODE |
| 1 | 5.17 | 4.7 × 10⁸ | Fair flavor, good body. | Fair melt, sl. burn and blister, fair stretch. | 4 |
| | (5.28) | (3.3 × 10⁷) | (Lacks flavor, fair body). | (Fair to poor melt, sl. burn & blister, fair stretch). | (4) |
| 2 | 5.23 | 5.5 × 10⁸ | Excellent flavor, sl. weak body. | Excellent white cook, good melt and stretch. | 3+ |
| | (5.31) | (8.7 × 10⁸) | (Sl. flavor, fair body). | (Good white cook, some burn & blister, good melt & stretch) | (3) |
| 3 | 5.12 | 2.4 × 10⁸ | Excellent flavor, sl. weak body. | Excellent melt, stretch, and color. | 1+ |
| | (5.35) | (2.0 × 10³) | (Sl. flavor, fair | (White cook, | (3—) |

TABLE E-continued

| | | | Lactobacillus casei | | |
|---|---|---|---|---|---|
| AGE IN WEEKS | pH | STANDARD PLATE COUNT/G | CHEESE QUALITY | MELTING QUALITY | LACTOSE COLOR CODE |
| | | | body). | poor melt) | |

Moisture: *Lactobacillus casei* - 47.0%; Negative control - 45.3%.
*Lactobacillus casei* - 1.42%; Negative control - 1.35%.

In evaluating the foregoing experimental examples, it will be appreciated that variables enter into the preparation of particular batches of cheese. However, it is apparent that the process of this invention provides a means for reducing the final lactose sugar content of the cheese to a lower value than would otherwise be obtained. By using a sufficient amount of the added culture, and holding the cheese under cold storage conditions for one to four weeks, the lactose sugar content can be reduced to the point where a substantially non-burning pizza cheese is obtained. However, the process of this invention need not be used in its preferred or optimum forms to be of value. For use as a pizza cheese, any reduction in lactose content over that which would otherwise be obtained is an advantage. Furthermore, it appears that other properties of the cheese are also improved. In general, the cheese produced by the method of this invention has improved melting characteristics. The flavor of the cheese may also be improved, and on baking, the cheese has improved color.

We claim:

1. The process of manufacturing low-moisture Mozzarella cheese, including the steps of inoculating a batch of pasteurized cow's milk with a starter culture comprising from 1 to 3% based on the weight of the milk batch of *S. thermophilus* together with *Lactobacillus* selected from *L. bulgaricus, L. helveticus,* or both *L. bulgaricus* and *L. helveticus,* making cheese curd from the thus-inoculated milk including cooking the curd at 100° to 125° F., mixing and stretching the curd in water at a temperature above 130° F. to impart a stringy texture to the cheese, molding the mixed curd into bodies, and salting the molded bodies, wherein the improvement comprises: also inoculating said milk batch before making the cheese curd with from 0.5 to 3.0% based on the weight of the milk batch of an additional viable culture selected from cultures of *Pediococcus cerevisiae, Lactobacillus plantarum, Streptococcus faecalis, Streptococcus durans,* and *Lactobacillus casei,* and at the conclusion of said process holding the salted cheese bodies at a non-freezing temperature below 55° F. for 5 to 30 days while reducing the residual lactose sugar content of the cheese, said holding being continued until said cheese bodies have an average lactose sugar content below 0.3%.

2. The process improvement of claim 1 in which said additional culture is *Pediococcus cerevisiae.*

3. The process improvement of claim 1 in which said additional culture is *Lactobacillus plantarum.*

4. The process improvement of claim 1 in which said additional culture is *Streptococcus durans.*

5. The process improvement of claim 1 in which said additional culture is *Lactobacillus casei.*

6. The process improvement of claim 1 in which said additional culture is *Streptococcus faecalis.*

7. The process of manufacturing low-moisture Mozzarella cheese, including the steps of inoculating a batch of pasteurized cow's milk with a starter culture comprising from 1 to 3% based on the weight of the milk batch of *S. thermophilus* together with *Lactobacillus* selected from *L. bulgaricus, L. helveticus,* or both *L. bulgaricus* and *L. helveticus,* making cheese curd from the thus-inoculated milk including cooking the curd at a temperature of 100° to 125° F., mixing and stretching the curd in water at a temperature in the range of 135° to 155° F. to impart a stringy texture to the cheese, molding the mixed curd into bodies, and salting the molded bodies, wherein the improvement comprises: also inoculating said milk batch before making the cheese curd with from 1.5 to 2.5% based on the weight of the milk batch of an additional viable culture selected from cultures of *Pediococcus cerevisiae, Lactobacillus plantarum, Streptococcus faecalis, Streptococcus durans,* and *Lactobacillus casei,* and at the conclusion of said process holding the salted cheese bodies at a nonfreezing temperature below 55° F. for 5 to 15 days, while reducing the residual lactose sugar content of the cheese, said holding being continued until said cheese bodies have an average lactose sugar content below 0.25%.

8. The process improvement of claim 7 in which said additional culture is *Pediococcus cerevisiae.*

9. The process improvement of claim 7 in which said additional culture is *Lactobacillus plantarum.*

10. The process improvement of claim 7 in which said additional culture is *Streptococcus durans.*

11. The process improvement of claim 7 in which said additional culture is *Lactobacillus casei.*

12. The process improvement of claim 7 in which said additional culture is *Streptococcus faecalis.*

13. The process of claim 7 in which said additional inoculant is added to the milk in an amount of about 1 to 2% by weight based on the milk.

14. The process of claim 7 at which said holding is carried out at a temperature of about 35° to 50° F.

15. The stored curd process of manufacturing low-moisture Mozzarella cheese, including the steps of inoculating a batch of pasteurized cow's milk with from 1 to 3% based on the weight of the milk batch of a starter culture comprising *S. thermophilus* together with Lactobacillus selected from *L. bulgaricus L. helveticus,* or both *L. bulgaricus* and *L. helveticus,* making cheese curd from the thus-inoculated milk including cooking the curd at a temperature of 100° to 125° F., storing the cooked curd in a cold storage room until the internal pH of the curd reaches the proper pH for mixing and stretching, mixing and stretching the curd in water at a temperature above 130° F. to impart a stringy texture to the cheese, molding the mixed curd into bodies, and salting the molded bodies, wherein the improvement comprises: also inoculating said milk batch before making the cheese curd with from 0.5 to 3.0% based on the weight of the milk batch of an additional viable culture selected from cultures of *Pediococcus cerevisiae, Lactobacillus plantarum, Streptococcus faecalis, Streptococcus durans,* and *Lactobacillus casei,* and at the conclusion of said process holding the salted cheese bodies at a nonfreezing temperature below 55° F. for 5 to 30 days while reducing the residual lactose sugar content of the cheese, said holding being continued at least until said cheese bodies have an average lactose sugar content of below 0.3%.

16. The stored curd process of manufacturing low-moisture Mozzarella cheese, including the steps of inoculating a batch of pasteurized cow's milk with from 1 to 3% based on the weight of the milk batch of a starter culture comprising *S. thermophilus* together with Lactobacillus selected from *L. bulgaricus*, *L. helveticus*, or both *L. bulgaricus* and *L. helveticus*, making cheese curd from the thus-inoculated milk including cooking the curd at a temperature of 100° to 125° F., storing the curd in a cold storage room until the internal pH of the curd reaches the proper pH for mixing and stretching, mixing and stretching the curd in water at a temperature above 130° F. to impart a stringy texture to the cheese, molding the mixed curd into bodies, and salting the molded bodies, wherein the improvement comprises: also inoculating said milk batch before making the cheese curd with from 0.5 to 3.0% based on the weight of the milk batch of an additional viable culture selected from cultures of *Pediococcus cerevisiae*, *Lactobacillus plantarum*, *Streptococcus faecalis*, *Streptococcus durans*, and *Lactobacillus casei*, and at the conclusion of said process holding the salted cheese bodies at a non-freezing temperature below 55° F. for 5 to 15 days while reducing the residual lactose sugar content of the cheese, said holding being continued at least until said cheese bodies have an average lactose sugar content of below 0.25%.

* * * * *